L. H. HARTMAN

Sept. 30, 1930. AUTOMATIC BAG FILLING MACHINE Re. 17,816

Original Filed April 29, 1927 2 Sheets-Sheet 1

Inventor
Louis H. Hartman
By Paul G. Crampton
Attorney

L. H. HARTMAN
Sept. 30, 1930. AUTOMATIC BAG FILLING MACHINE Re. 17,816
Original Filed April 29, 1927 2 Sheets-Sheet 2
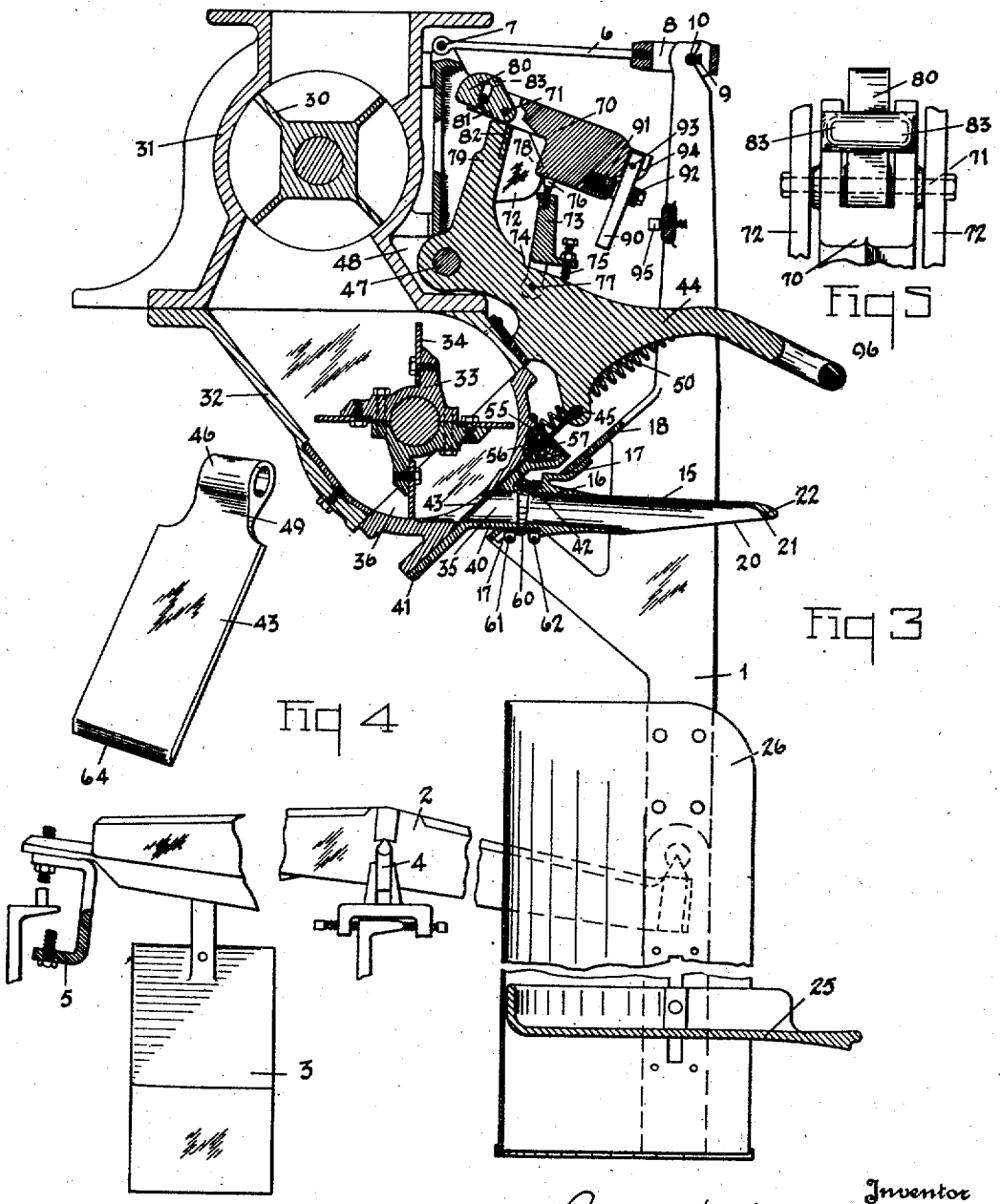
Inventor
Louis H. Hartman
By Ernest G. Crampton
Attorney Reissued Sept. 30, 1930 Re. 17,816

UNITED STATES PATENT OFFICE

LOUIS H. HARTMAN, OF TOLEDO, OHIO, ASSIGNOR, BY MESNE ASSIGNMENTS, TO BATES VALVE BAG CORPORATION, OF NEW YORK, N. Y., A CORPORATION OF NEW JERSEY

AUTOMATIC BAG-FILLING MACHINE

Original No. 1,667,858, dated May 1, 1928, Serial No. 187,660, filed April 29, 1927. Application for reissue filed October 15, 1928. Serial No. 312,713.

My invention has for its object to provide a dispensing machine having an automatic weight regulative cut-off for subdividing the material into portions of desired weight. My invention is an improvement particularly in bag filling machines that are automatically controlled by the weight of the material that is delivered to suitable receptacles. The invention provides means whereby the number of the parts of the machine is greatly reduced, a better coordinate operation of the parts is produced and a more accurate response of the machine, to the weight of the material that is discharged into the receptacle, is attained.

The invention may be contained in dispensing machines of different forms and to illustrate a particular application of my invention, I have selected one of such machines as an example and shall describe it hereinafter. The machine selected is illustrated in the accompanying drawings.

Figure 1:
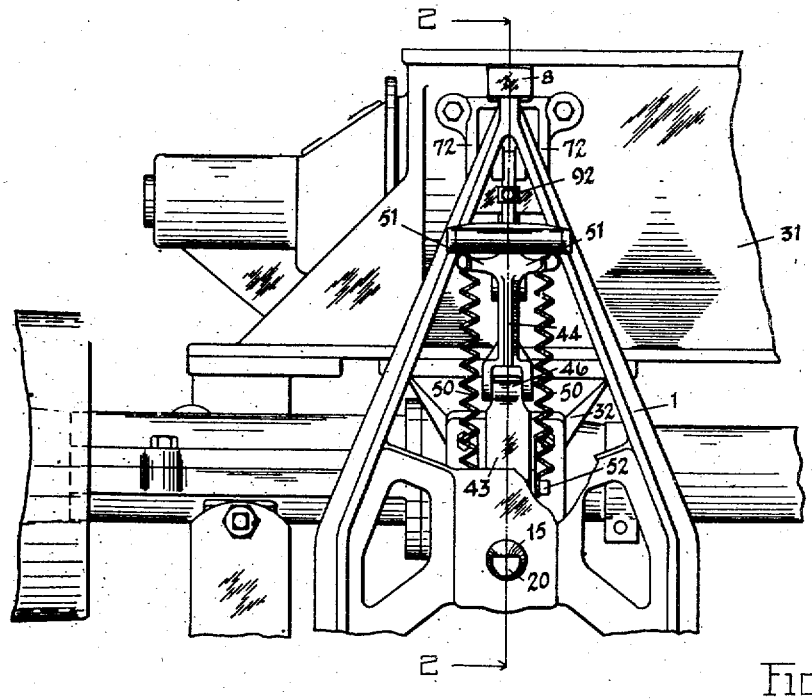
Figure 2:
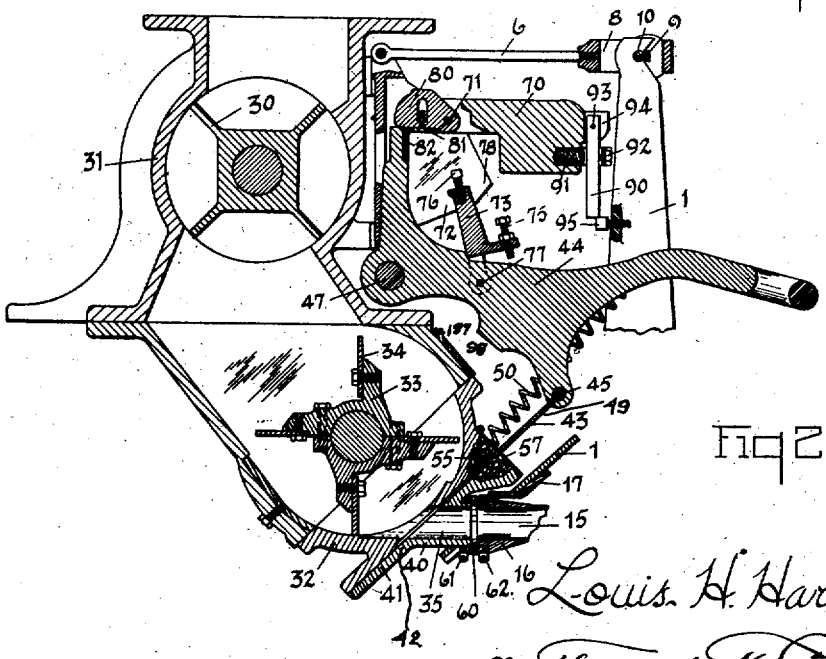

Fig. 1 illustrates a front broken view of the upper part of the machine. Fig. 2 is a view of a section taken on the plane of the line 2—2 indicated in Fig. 1. Fig. 3 illustrates a view of a section similar to that shown in Fig. 2, certain of the parts being shown in position different from that shown in Fig. 2. Fig. 4 illustrates the cut-off blade which closes the outlet of the machine. Fig. 5 is a top view of a part of the trip mechanism on the machine.

In the form of construction shown, a movable frame 1 is supported on the end of the scale beam 2 having the counterbalancing weight 3 which is suitably and adjustably supported on the other end of the scale beam. The scale beam has a suitable fulcrum 4 and stops 5 for limiting the movements of the scale beam on the fulcrum 3. The frame is susceptible to slight vertical movements and is held in an upright position by means of a horizontally extended rod 6 that is pivotally connected at one end to the machine by means of the pin 7 and to a stirrup 8 at the other end. The stirrup 8 has a knife edge 9 that engages in a socket formed in a cross member 10 of hardened material located in the upper end of the frame 1. Lateral movement of the bar 10 away from the knife edge 9 is prevented by the relative location of parts of the machine as hereinafter described.

A nozzle or spout, hereinafter referred to as a filler tube 15, is connected to the frame 1. The tube 15 may be located in a sleeve or its wall may be provided with a tapering end portion 16. Fingers 17, that extend from the inner end of the tube, are connected to a sloping shelf or plate 18 that is formed integral with the frame 1. The filler tube is thus connected to the frame 1. The filler tube 15 has a substantially elliptical opening 20 located on its under side, the edge of the opening 20 being located in a plane that extends at a slight angle to the axis of the filler tube 15. The outer end of the filler tube is provided with a sloping surface 21 that is inclined downward. The inclined surface 21 may be formed by increased thickness of the end of the filler tube as at 22, or by securing a small block of metal in the end to form the downwardly inclined surface 21 or the end of the tube may be bent downward. The surface 21 operates to direct the material, that is discharged through the filler tube, at an angle downwards into a suitable receptacle, such as, a bag that may be located below the filler tube or partially supported on the filler tube.

The frame 1 may be provided with a suitable platform 25. Preferably the platform 25 is adjustably connected to the sides of the frame 1 so that it may be adjusted according to the height of the receptacle, or the length of the bag, with reference to the filler tube 15. If desired, a shield 26 may be connected to the sides of the frame 1 and located around three sides of the platform 25 for retaining the receptacle in position. In the particular form of construction shown, the machine is designed for filling bags with finely divided material such as cement, plaster, etc., the bags used having openings in the upper corners, the upper ends of the bags being so constructed that they may be readily slipped over the filler tube 15. The platform 25 is so positioned as to support the major portion of the weight of the material inserted into the bag while the tube 15 holds the top up and in position that the bag may be filled.

In dispensing finely divided material of the character described, it is necessary to provide a mechanism for feeding the material to the outlet and at the same time also hold back the material from the bins which, by reason of its enormous weight, subjects the material at its outlet to enormous pressure. In the form of construction shown, a rotating valve or feeder 30 is supported in the shell 31 which regulates the supply of the material to the casing 32. The casing 32 is provided with an ejector 33 having the blades 34 that move the material towards the outlet or orifice 35. The ejector 33 is, however, so constructed that it will operate to feed the material into the orifice 35. The casing 32 has a surface 36 that is eccentric to the center of rotation of the ejector 33 and coacts with the blades 34 of the ejector 33 to work the material into the orifice 35. The axis of the orifice 35 is substantially tangential to the circle described by the centers of the blades 34 and so that the blades 34, where they come in close proximity to the surface 36, operate to force the material through the orifice 35.

The orifice 35 is formed within a neck 40 that is integral with a plate 41 which is secured to the casing 32. A shallow recess 42 is formed within the casing 32 which extends from a point well above the orifice 35 to a point below the lower side of the orifice, as shown in Fig. 2, and a shutter in the form of a blade 43 substantially fits the recess and is slidably movable in the recess to close and open the orifice. The blade 43 is connected to a lever 44 by means of a pin 45 that extends through a sleeve 46 that may be formed integral with the blade 43. The lever 44 is pivotally mounted on the pin 47 extending between flanges 48 that are formed integral with the shell 31. A pad 97 is provided on the casing in position to be contacted by a lug 98 on lever 44 and limit the movement of the lever before the end of the blade quite reaches the bottom of recess 42; but as the bottom of the recess is frequently filled with the material being fed, the end of the blade encounters this material, and consequently, the momentum of the lever 44 is frequently sustained by the blade upon the completion of its closing stroke in closing the orifice 35. In order to withstand this impact, the blade 43 is made thicker at the point of the juncture between the blade 43 and the sleeve 46, as at 49. The lateral surfaces of the blade 43 flare at this point to produce curved surfaces where the exterior surface of the sleeve 46 joins with the lateral surfaces of the blade 43. Also, to insure quick closing of the orifice 35, the lever 44 may also be provided with a pair of springs 50 that are connected to laterally extending lugs 51 and to lugs 52 that are connected to the casing 32. The tension springs 50 coact with the weight of the lever 44 to operate the blade 43 to produce a quick closure of the orifice 35 and the enlarged shank of the blade 43 is so made as to withstand this impact. However, in the closing movement of the blade the resistance of the finely divided material, somewhat compacted by the feeder 33 tends to retard the movement of the blade produced by the weight of the lever 44 and the springs 50. Where the finely divided material contains a fibrous ingredient, the resistance to the movement of the blade through the material is somewhat greater and since the blade should quite entirely close the orifice to prevent the movement of the material beneath the edge of the blade, it is necessary that the blade should be subjected to a considerable downward pressure when it is closed. This is accomplished by the springs 50 and the momentum of the lever 44. The sharpened edge permits penetration of the finely divided material and permits the insertion of the blade 43 to a point substantially at the lower side of the orifice 35. The sharpened edge is of particular value where a fibrous ingredient is contained in the finely divided material that is dispensed by the machine and enables the blade 43 to make its complete movement in closing the orifice 35 and prevent escape of the material beneath the end of the plate by the compacting action of the ejector.

As indicated in the drawings, the orifice is rounded in cross section, while the end of the blade is comparatively square. As a result, when the blade passes downward the sharpened front side of the blade shears off the material against the face of plate 40, beginning at the corners of the blade as soon as the middle of the blade passes the middle of the orifice and continuing towards the center of the blade as it moves downward.

The upper end of the blade 43 moves within a recess 55 that is formed between the plate 41 and the casing 32. Packing material 56 is located in the recess 55 to prevent the blade 43 from drawing out with it any of the subdivided material. Since the blade 43 does not pass through the lower side of the casing 32, and only to the lower edge of the orifice 35, escape of the material from the machine except through the orifice 35 and into the receptacle is entirely eliminated. The recess 55 is closed by means of a plate 57 which operates to retain the packing 56 within the recess.

The orifice 35 is made very short so as to locate the filler tube 15 very close to the blade 43 and to the ejector 33. A short flexible tube 60 interconnects the ends of the neck 40 and the filler tube 15. The ends of the flexible tube are connected to these parts by suitable clamping collars 61 and 62. The flexible tube 60 is thus located in close proximity to the blade 43 and, consequently, is subjected to the compaction produced by the ejector 33 which, however, is normally uniform while the material is being fed into the receptacle. The ends of the neck 40 and of the filler tube 15 being located in close though spaced relation, are spanned by the very short tube 60, and the vertical movement of the filler tube 15 and of the frame 1, relative to the neck 40, is necessarily very short. It is during this slight vertical movement of the filler tube 15, relative to the neck 40, that the lever 44 is tripped to close the orifice 35. In order to prevent the movement of the blade 43 from affecting the responsiveness of the machine through a variation of the condition of the flexible tube 60 by further compaction of the material in the neck 40, the lower edge 64 of the blade is beveled as well as sharpened. The beveled side is located on the side that the ejector 33 is located on, and thus forces all material in its path back into the casing and does not affect the compaction of the material in the short flexible tube 60.

In order to trip the lever 44, a second lever 70 is pivotally supported on a pin 71 that extends between flanges 72 that protrude from the wall of the shell 31, or from a bracket that is secured to the wall of the shell. The lever 70 is weighted so that one end will drop towards the lever 44. A member 73 is pivoted on the lever 44 and is stopped in its movement in one direction by a shoulder 74 formed on the lever 44 and in its movement in the other direction by an adjustable pin 75 that is secured to the member 73. The end of the pin 75 is adapted to engage the edge of the lever 44. The effective length of the member 73 may be adjusted by a threaded pin 76 located in the upper end of the member. When, therefore, the lever 44 drops down by the operation of its own weight and the spring 50, the member 73 by reason of the relation of its center of gravity to its pivot pin 77, falls forward to a point between the levers 44 and 70. When the lever 70 drops down it engages the corners 78 of the flanges 72 that protrude from the wall of the shell 31. This gives ample opportunity for the member 73 to locate itself between the levers 44 and 70. When the lever 44 is raised, the head of the pin 76 engages the lever 70 to also raise the lever 70. The lever 44 is provided with an arm 79 while the lever 70 is provided with a dog 80 which is pivoted on the pin 71 that also pivotally supports the lever 70. The arm 79 of the lever 44 and the dog 80 are provided with engaging plates 81 and 82 of hardened metal that interengage to maintain the lever 44 in its raised position.

The dog 80 protrudes beyond the edge of its plate 81 and so that while the dog may be slightly raised with respect to the lever 70 as the arm 79 moves under the edge of the dog, yet when the arm passes beyond the plate 81 the dog 80 will drop so as to position the edges of the plates 81 and 82 in engaging relation. The dog 80 allows for the difference in direction of movement between the arm 79 about the pivot pin 47 and the movement of the lever 70 about the pivot 71. Downward movement of the dog 80 is limited by a pair of lugs 83 that engage the end of the lever 70.

When the lever 70 has been raised to a position such that the lever 44 will be engaged by the dog 80, the lever 70 will be held in this position by means of a pivoted arm 90. The arm 90 is spring pressed by means of the spring 91 against a suitable stirrup 92 that extends around the outside of the arm 90. The arm 90 is pivoted on a pin 93 that extends through a pair of lugs 94 on the outer end of the lever 70. A pin 95 is located in the frame 1 and so as to be engaged by the end of the arm 90. When the lever 70 is raised, the lower end of the arm 90 will be stayed in its lateral movement by the end of the pin 95 until the lower end of the arm 90 passes above the pin 95. This stay in the lateral movement will be yieldingly resisted by the elasticity of the spring 91 and the arm 90 will thus be slightly snapped into engagement with the pin 95. The adjustments are such that engagement with the pin 95 will occur at the same time that the plates 81 and 82 interengage and so that the lever 44 will be held in its raised position by the lever 70. A slight return movement of the lever 70 to place the plates 81 and 82 into contact releases the member 73 from its interengaging relation as between the levers 44 and 70 and, consequently, the member 73 will, by reason of the change of the position of its center of gravity, relative to its pivot pin 77, drop back against the stop 74 and thus be displaced from engaging relation with the lever 70. The adjustment of the arm 90 and the pin 95, with reference to the center of rotation of the lever 70 about the pin 71, is such that a very slight downward movement of the frame 1, which is within the limits of the movement permitted by the flexible tube 60, will permit the end of the arm 90 to be drawn off the end of the pin 95 and the lever 70 will drop down until it is engaged by the shoulders 78. This will release the lever 44 which acting under the force of its own weight, and the springs 50, will cause the blade 43 to close the orifice 35. This will occur when the weight of the material which is directed into the receptacle, such as a bag placed upon the platform 25, has reached the predetermined amount as determined by the location of the weight 3 on the scale beam 2, and the further movement through the orifice 35 and the filler tube 15 will cease. The filled bag may then be withdrawn from the filler tube 15 and from the scales and a new bag may be placed on the filler tube. The lever 44 may then be raised by lifting on the handle 96 which will cause the member 73, which has dropped into engaging relation with respect to the lever 70, to raise the lever 70 until the end of the arm 90 engages with the pin 95, while at the same time the member 73 will drop against the stop 74 and the arm 79 will be engaged by the dog 80. This movement of the lever 44 will draw the blade 43 along its recesses and through the packing material 56 which opens the orifice 35 and the material continues to move through the filler tube 15. This continues until the frame 1 is again moved downward by the weight of the material in the bag which causes the levers 44 and 70 to drop and the member 73 to fall into its engaging relation with respect to the levers 44 and 70 to raise the lever 70 when the lever 44 is raised.

It is convenient to form the slot in the upper side of the discharge passage and the notch in the lower side by fitting plate 41 against the casing where recess 42 is formed around the discharge orifice; but it will be readily understood that a similar notch and slot could be formed in an integral construction of casing and discharge member, if desired, and other changes may be made within the scope of the appended claims while still retaining the substance of the invention.

What I claim is:

1. In a dispensing machine, a filler tube for directing the material dispensed into a receptacle, a machine casing having an orifice communicating with the tube, an ejector located in the casing for forcing the material through the orifice and the tube, a frame for supporting the receptacle and the filler tube, a scale for supporting the frame, a flexible tube interconnecting the casing and the filler tube, and a cut-off blade movable in the casing, the lower end of the cut-off blade extending to near the lower end of the orifice when the orifice is closed by the blade.

2. In a dispensing machine, a weighing scale for supporting a receptacle, a filler tube for receiving the upper end of the receptacle, a machine casing, a flexible tube interconnecting a filler tube and the casing for conducting material from the casing to the filler tube, an ejector for forcing material from the casing through the flexible tube and the filler tube and into the receptacle and located in close proximity to the inner end of the filler tube, and a blade movable in the casing and located between the ejector and the flexible tube, the lower edge of the blade being sharper than the other edges of the blade.

3. In a dispensing machine, a weighing scale for supporting a receptacle, a filler tube for receiving the upper end of the receptacle, a machine casing having an orifice, a flexible tube interconnecting the orifice with the filler tube for conducting material from the casing to the filler tube, an ejector for forcing material from the casing through the flexible tube and the filler tube and into the receptacle and located in close proximity to the flexible tube, and a blade having a sharpened edge movable in the casing and located between the ejector and the flexible tube for closing the orifice, the lower sharp edge located substantially at the lower side of the orifice when the orifice is closed by the blade.

4. In a dispensing machine, a weighing scale for supporting a receptacle, a filler tube for receiving the upper end of the receptacle, a machine casing, a flexible tube interconnecting a filler tube and the casing for conducting material from the casing to the filler tube, an ejector for forcing material from the casing through the flexible tube and the filler tube and into the receptacle and located in close proximity to the flexible tube, and a blade movable in the casing and located between the ejector and the flexible tube, the lower edge of the blade being beveled on the side that the ejector is located on.

5. In a dispensing machine, a filler tube, a frame, a scale for supporting the frame, the filler tube connected to the frame, a machine casing, an ejector located in the casing, a flexible tube for connecting the filler tube with the casing, a shutter blade located in the casing, a lever for operating the shutter blade, a second lever, means located on the frame for tripping the second lever to disengage the first lever to cause the first lever to close the shutter blade, a member pivoted on the first named lever, stops for limiting the movements of the said member to position the said member between the first and second levers when the shutter is closed and for raising the second lever when the first lever is raised and to disconnect the levers when the first lever has been engaged by the second lever.

6. In a dispensing machine, a filler tube for directing the material dispensed into a receptacle and extending substantially horizontally, a machine casing having an orifice communicating with the tube, an ejector located in the casing for forcing the material through the orifice and the tube, a counterbalanced movable frame for supporting the receptacle and the filler tube, a flexible tube interconnecting the casing and the filler tube, and a cut-off blade movable in the casing and across the orifice, the lower end of the cut-off blade extending to near the lower end of the orifice when the orifice is closed by the blade.

7. In a dispensing machine, a filler tube for directing the material dispensed into a receptacle, a machine casing having an orifice communicating with the tube, an ejector located in the casing for forcing material through the orifice and the tube, a frame for supporting the receptacle and the filler tube, a scale for supporting the frame in position to hold the filler tube in receiving relation to said orifice, and a cut-off blade movable in the casing, the lower end of the cut-off blade extending to near the lower end of the orifice when the orifice is closed by the blade.

8. In a dispensing machine, a filling tube for directing the material dispensed into a receptacle and extending substantially horizontally, a machine casing having an orifice communicating with the tube, an ejector located in the casing for forcing the material through the orifice and the tube, a counterbalanced movable frame for supporting the receptacle and the filler tube in position to hold the filler tube in receiving relation to said orifice and a cut-off blade movable in the casing and across the orifice, the lower end of the cut-off blade extending to near the lower end of the orifice when the orifice is closed by the blade.

9. In a dispensing machine, a casing having a discharge orifice, a passage leading from the interior of the casing to the orifice, a slot through the wall of the casing into one side of the passage and a notch in the other side of the passage, a propeller in the casing adapted to discharge powdery or granular material through the passage and orifice, and a gate slidable through the slot and having an end adapted to enter the notch and bear against the side of the notch towards the orifice.

10. In a dispensing machine, a casing having a discharge orifice, a passage leading from the interior of the casing to the orifice, a slot through the wall of the casing into one side of the passage and a notch in the other side of the passage, the side of the passage in which the notch is made being rounded, a propeller in the casing adapted to discharge material through the slot and into the notch, the end of the gate being sharpened and arranged in sliding relation with one side of the notch and being shaped so that it shears against one wall of the notch first near the corners of the gate and then towards the middle thereof.

11. In a dispensing device, a casing having a discharge orifice, a passage leading from the interior of the casing to the orifice, a slot through the wall of the casing into one side of the passage and a notch in the other side of the passage, and a gate slidable through the slot and having an end adapted to enter the notch, the end of the gate being sharpened and only partially filling the notch when the gate is closed.

12. In a dispensing device, a casing having a discharge orifice, a passage leading from the interior of the casing to the orifice, a slot through the wall of the casing into one side of the passage and a notch in the other side of the passage, and a gate slidable through the slot and having an end adapted to enter the notch, one face of the end of the gate being adapted to slide against one wall of the notch and the other face of the end of the gate being beveled.

13. In a dispensing device, a casing having a discharge orifice, a passage leading from the interior of the casing to the orifice, a slot through the wall of the casing into one side of the passage and a notch in the other side of the passage, a gate slidable through the slot and having an end adapted to enter the notch, means to move the gate towards the notch, and a stop in position to stop said moving means with the end of the gate located substantially at the lower side of the orifice and before it has entered to the full depth of the notch.

14. In a dispensing device, a casing and a discharge member having a passage leading from the casing, there being a slot through the wall at one side of said passage and a notch in the wall at the other side of the passage, a gate reciprocable in said slot and having a sharpened end adapted to enter said notch and a stop adapted to stop the movement of the gate before the sharpened end thereof has entered to the full depth of the notch.

15. In a dispensing device, a casing having a discharge orifice, a passage leading from the interior of the casing to the orifice, a slot through the wall of the casing into one side of the passage and a notch in the other side of the passage, a gate slidable through the slot and having an end adapted to enter the notch, one face of the end of the gate being adapted to slide against one wall of the notch and the other face of the gate being beveled, and means outside of the casing to stop the movement of the gate with its end located near the notch side of the orifice.

16. In a dispensing device, a casing having a discharge orifice, a passage leading from the interior of the casing to the orifice, a slot through the wall of the casing into one side of the passage and a notch in the other side of the passage, and a gate slidable through the slot and having an end adapted to enter the notch, the slot and notch being arranged for diagonal movement of the gate across the passage.

17. In a dispensing device, a casing having a discharge orifice, a passage leading from the interior of the casing to the orifice, a slot through the wall of the casing into one side of the passage and a notch in the other side of the passage, and a gate slidable through the slot and having an end adapted to enter the notch, and packing in the slot around the gate.

In testimony whereof, I have hereunto signed my name to this specification.

LOUIS H. HARTMAN.